(12) United States Patent
Divisi

(10) Patent No.: US 9,303,815 B2
(45) Date of Patent: Apr. 5, 2016

(54) LUBRICATION DEVICE WITH FLOWMETER

(71) Applicant: DROPSA S.p.A., Milan (IT)

(72) Inventor: Walter Divisi, Monaco (MC)

(73) Assignee: DROPSA S.P.A., Milan (IT)

( * ) Notice: Subject to any disclaimer, the term of this patent is extended or adjusted under 35 U.S.C. 154(b) by 338 days.

(21) Appl. No.: 13/776,132

(22) Filed: Feb. 25, 2013

(65) Prior Publication Data

US 2013/0220736 A1    Aug. 29, 2013

(30) Foreign Application Priority Data

Feb. 27, 2012  (IT) ............................. MI2012A0288

(51) Int. Cl.
*F16N 29/00* (2006.01)
*G01F 3/08* (2006.01)
*G01F 15/14* (2006.01)
*F16N 29/02* (2006.01)

(52) U.S. Cl.
CPC ................ *F16N 29/00* (2013.01); *F16N 29/02* (2013.01); *G01F 3/08* (2013.01); *G01F 15/14* (2013.01)

(58) Field of Classification Search
CPC ......... F16N 29/00; F16N 29/02; G01F 15/14; G01F 3/08
USPC ................................ 184/7.4; 73/861.11, 323
See application file for complete search history.

(56) References Cited

U.S. PATENT DOCUMENTS

| | | |
|---|---|---|
| 608,342 A | 8/1898 | McElroy |
| 1,001,111 A | 8/1911 | Wood |
| 1,185,970 A | 6/1916 | Bower |
| 1,525,733 A | 2/1925 | Haskell |
| 1,619,937 A | 3/1927 | Huff |
| 1,806,565 A | 5/1931 | Russel |
| 1,966,294 A | 7/1934 | Goslee |
| 2,521,314 A | 9/1950 | Therolf |
| 2,541,176 A | 2/1951 | Rockwell |
| 3,521,852 A | 7/1970 | Gillis |
| 3,776,276 A | 12/1973 | Stiltner |
| 3,789,881 A | 2/1974 | Kozulla et al. |
| 3,791,413 A | 2/1974 | Muller et al. |

(Continued)

FOREIGN PATENT DOCUMENTS

| | | |
|---|---|---|
| DE | 2123163 A1 | 12/1972 |
| DE | 3942857 C1 | 5/1991 |

(Continued)

OTHER PUBLICATIONS

U.S. Appl. No. 13/776,241 to Walter DIVISI-"Lubrication Device With Fluid Lubricant Flow Rate Regulation," filed Feb. 25, 2013.

(Continued)

*Primary Examiner* — William E Dondero
*Assistant Examiner* — Mark K Buse
(74) *Attorney, Agent, or Firm* — Vorys, Sater, Seymour and Pease LLP

(57) ABSTRACT

A lubrication device including a tank of fluid lubricant to be dispensed to a user position, a component for raising the pressure of the lubricant, a device for regulating the flow rate of the lubricant under pressure, and a distributor for enabling the lubricant flow to be conveyed to the user position with regulated flow rate, the lubricant flow rate regulator device being provided with a lubricant flowmeter which reads the flow rate regulated by the regulator device.

20 Claims, 3 Drawing Sheets

(56) References Cited

U.S. PATENT DOCUMENTS

| | | |
|---|---|---|
| 4,015,631 A | 4/1977 | Hayes |
| 4,356,996 A | 11/1982 | Linder et al. |
| 4,399,709 A * | 8/1983 | Diepold-Scharnitzky . 73/861.77 |
| 4,650,155 A | 3/1987 | Liantonio |
| 5,010,767 A * | 4/1991 | Divisi ............................. 73/253 |
| RE33,782 E | 12/1991 | Fujita et al. |
| 5,163,476 A | 11/1992 | Wessman |
| 6,293,514 B1 | 9/2001 | Pechoux et al. |
| 6,796,264 B1 * | 9/2004 | Appenzeller et al. ......... 116/112 |
| 6,807,984 B2 | 10/2004 | Volovets et al. |
| 6,973,941 B2 | 12/2005 | Baumann |
| 7,757,711 B2 | 7/2010 | Hama |
| 7,832,425 B2 | 11/2010 | Wears et al. |
| 8,356,617 B2 | 1/2013 | Labrie |
| 8,574,045 B2 | 11/2013 | Warner |
| 8,628,509 B2 | 1/2014 | Kropczynski, et al. |
| 8,833,392 B2 | 9/2014 | Norlander et al. |
| 2014/0000314 A | 9/1935 | Defenbaugh |
| 2003/0226406 A1 * | 12/2003 | Carlson ..................... 73/861.57 |
| 2007/0040136 A1 | 2/2007 | Caprera |
| 2011/0213573 A1 * | 9/2011 | Carmichael et al. ............ 702/47 |
| 2012/0031195 A1 * | 2/2012 | Skirda et al. ............... 73/861.08 |
| 2012/0031703 A1 | 2/2012 | Divisi |

FOREIGN PATENT DOCUMENTS

| | | |
|---|---|---|
| EP | 0033701 A2 | 8/1981 |
| EP | 0498242 A2 | 8/1992 |
| GB | 694888 A | 7/1953 |
| GB | 832977 A | 4/1960 |

OTHER PUBLICATIONS

European Search Report and Written Opinion dated Sep. 26, 2012 for Italian patent application No. MI2012A000288.

Dec. 1, 2014, Office Action for U.S. Appl. No. 13/776,241, Walter DIVISI, filed Feb. 25, 2013.

Office Action of Apr. 17, 2015 from U.S. Appl. No. 13/776,241 to Walter DIVISI, filed Feb. 25, 2013.

* cited by examiner

LUBRICATION DEVICE WITH FLOWMETER

CROSS-REFERENCE TO RELATED APPLICATIONS

This claims the priority of Italian Patent Application No. MI2012A000288 filed on 27 Feb. 2012.

The invention relates to a lubrication device with regulation of the fluid lubricant flow rate, having a flowmeter of the said regulated flow rate. Known lubrication devices comprise a lubricant tank and means for pressurizing the lubricant contained in the tank in order to feed it to user points requiring lubrication. By way of example, such user points can be for example bearings on paper production machines or forging presses subjected to considerable loads and heat.

It is well known that the flow rate of the fluid reaching the utilization zone must be regulated and controlled to prevent lubricant wastage or insufficient lubrication due to a deficiency of dispensed fluid.

Modular regulator devices associated with flowmeters are used for this purpose.

Essentially, modular flow regulators are positioned downstream of the pressure raising means. Essentially, by positioning flow regulators side by side, a main channel is formed in which the lubricant is present under pressure, each module drawing from the common channel to feed the fluid to a utilization position, with a different flow rate.

Each module also enables regulation and possible control of the lubricant flow rate.

In this respect, a feed channel is present in each module, communicating with the main channel. An outflow channel is also present, connected to suitable means for controlling the flow downstream of which the means for distributing the lubricant are present.

Those flowmeters associated with regulator modules are currently of volumetric type and present a satellite which, urged by the lubricant flow, describes an orbit each time the predetermined lubricant quantity flows through the regulator. The satellite is formed of metal, and in the flowmeter body, formed of plastic for economy, a hole is provided into which an inductive sensor is inserted.

The drawback of this solution is that the sensor has to be positioned very close to the point in which the satellite passes. This means that a dead hole has to be formed substantially facing the chamber in which the oil flows and the satellite orbits.

A first fundamental problem linked to this hole is that it causes considerable thinning of the wall at which the satellite is present and hence imposes a reduction in operating pressures, or otherwise imposes the use of very strong and costly plastics.

Given that the flowmeter body can be made virtually only of plastic for economy reasons, this becomes a very considerable problem.

A second but important problem is that once positioned in the hole, the sensor must be calibrated, it being also necessary to move it axially within it so that it assumes the optimal reading position.

A third drawback is that the satellite must be made of metal to enable the is sensor to detect its passage.

An object of the present invention is to provide a lubrication device with a flowmeter which is improved compared with the known art, in the sense that it provides more accurate measurements, it enables greater pressures to be used than traditional flowmeters for equal materials and size utilized in its construction, it enables wide freedom of design and of construction materials especially for the satellite, and it enables quick and effective replacement of the sensor when damaged, by minimizing the time required for its calibration.

This and other objects are attained by a lubrication device with a flowmeter in accordance with the technical teachings of the accompanying claims.

Further characteristics and advantages of the invention will be apparent from the description of a preferred but non-exclusive embodiment of the lubrication device with regulator and flowmeter, illustrated by way of non-limiting example in the accompanying drawings, in which.

Figure 7:
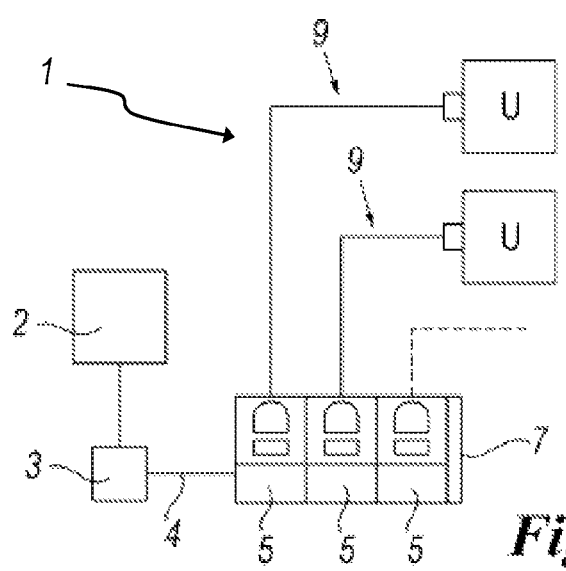
FIG. 7 is a schematic view of the device according to the present is invention.

With reference to said figures, these show a minimum lubrication device indicated overall by the reference numeral 1 (FIG. 7).

It comprises a tank 2 of fluid lubricant to be dispensed to a utilization position U and means for raising the pressure of said lubricant such as a pump 3. The pump can be for example of positive-displacement type and can hence draw directly from the tank, or can be of pneumatic type and hence be able to put the tank under pressure.

The pressurized lubricant, preferably oil, reaches a flow regulator device 5 via a connection 4 under pressure.

FIG. 7 shows three side-by-side modular devices blocked by a terminal plate 7. The modules and the plate are fixed together with the aid of screws passing through holes.

Figure 1:
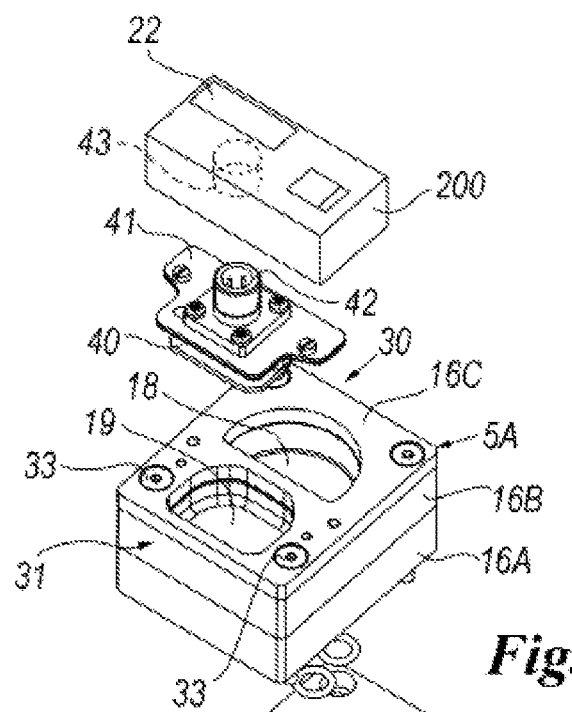
FIG. 1 is an exploded view of a flow regulator device coupled to a system for measuring the regulated flow rate, according to the present invention.
Figure 2:
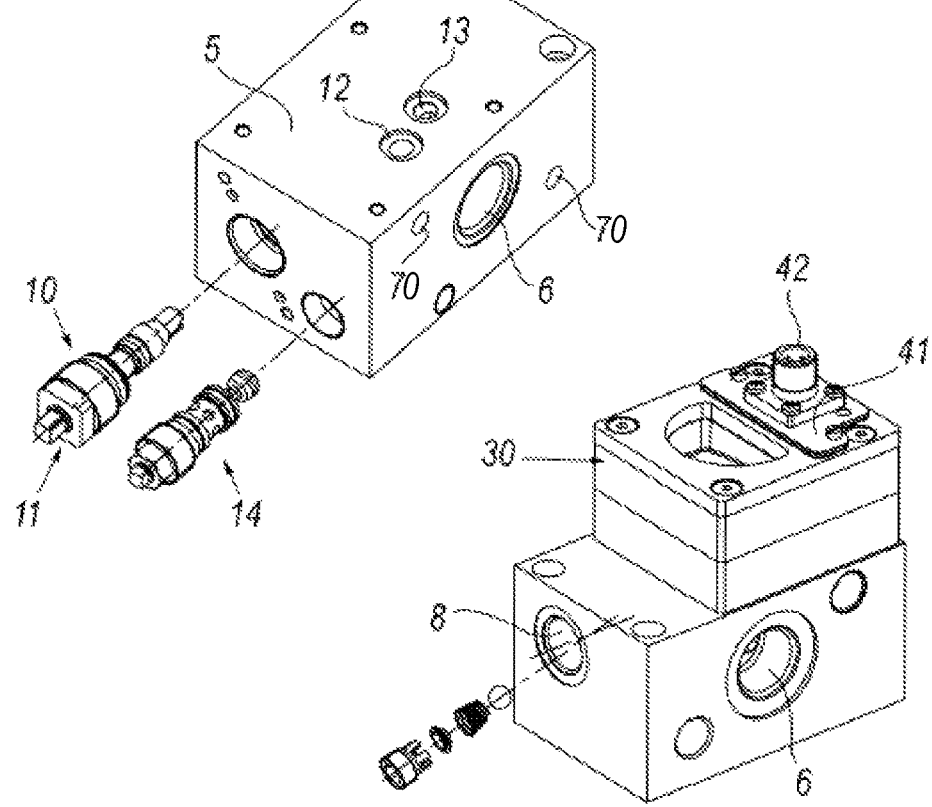
FIG. 2 is a view from another angle of the system represented in FIG. 1, but with certain parts connected together.

The flow regulator device 5 is better represented in FIG. 1.

Each regulator device 5 presents a through hole 6 forming a channel into which the lubricant originating from the pump 3 is fed. When several similar modules 5 are fixed together, the channel holes 6 are aligned to hence form a feed channel common to all the flow regulator devices 5.

Additional modules can hence be positioned without having to make substantial modifications to the plant.

Each regulator device 5 presents an outlet 8 for the lubricant, the flow rate of which is regulated. This outlet is connected to distribution means 9 enabling the lubricant stream to be conveyed with regulated flow rate to the utilization position U.

The regulator device is best visible in FIG. 1, shown with a flowmeter 5A coupled to it.

The fluid flow rate device presents specifically a regulator valve 10, for example of the needle or other type, which in known manner regulates the flow rate in a manner adjustable by acting on a mover element 11.

Essentially the fluid leaves the port 12 with regulated flow rate, enters the flowmeter 5A and re-enters the port 13 to be conveyed to the outlet port 8.

The flow regulator device 5 also comprises a by-pass valve 14, which when operated connects the outlet of the regulator valve 10 directly to the outlet 8. The by-pass valve is very important for example during maintenance or flowmeter replacement, which can be carried out without halting the plant.

The flowmeter is of volumetric type and presents a satellite 15 which, urged by the lubricant flow, describes an orbit (eccentric in the described device, but not necessarily of this type) each time a predetermined lubricant quantity flows through the regulator.

The satellite is substantially a conventional disc made of metal, but according to the present invention can be instead made of plastic material with enormous cost advantages.

For example the disc and the principle of operation of the flowmeter 5A are of the type already produced by DROPSA and marketed as the FLOWMASTER device, the subject of the document EP0370253 (A1) which is to be understood as incorporated for reference into the present text.

The body 16 of the measuring device comprises a base 16A preferably of plastic formation in which the guides and seats 160 required for guiding the movement of the satellite are formed, together with the inflow and outflow channels for the lubricant to and from the flowmeter.

In this respect, the base 16A comprises two channels which couple with the apertures 12 and 13 of the regulator 5.

Above the base a transparent part 16B is provided made for example of polyamide (TRANSPARENT PA) but can instead be made of any other transparent plastic material.

The transparent part presents cavities, grooves and shapings which enable it to be coupled to the base, to define seats 160 and guides within which the satellite moves.

Figure 5:
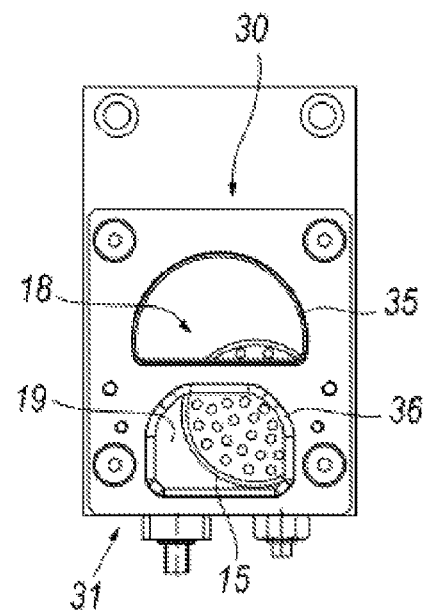
FIG. 5 is a plan view of a regulator and flowmeter according to the present invention, in which a part has been removed.
Figure 6:
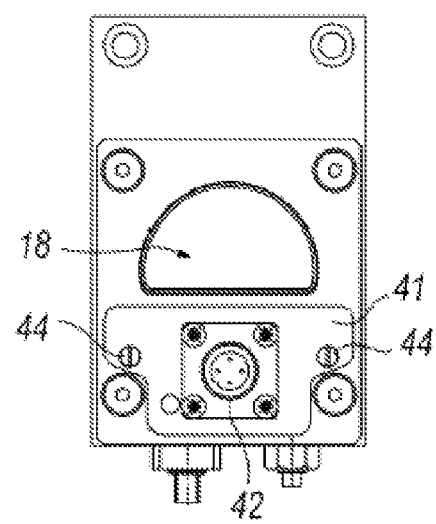
FIG. 6 is a plan view of a regulator and flowmeter according to the present invention.

From the view of FIG. 5 it can be seen that the transparent part 16B presents a first zone 18 through which the satellite movement can be seen from the outside, and a second zone 19 in which an optical sensor 20 (FIG. 4) is located (FIG. 6) to sense satellite passage below it.

Figure 4:
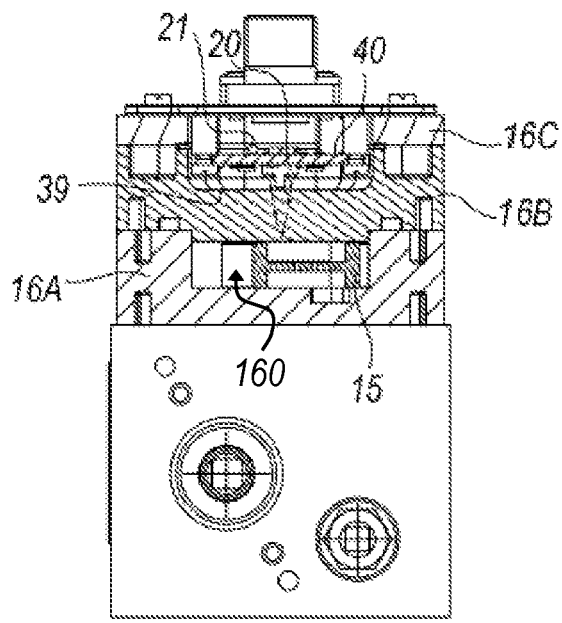
FIG. 4 is a front view of the device of FIG. 1 in which the flowmeter is shown sectioned.

In FIG. 4 the arrows indicate the operation of the optical sensor which comprises an emitter and a receiver placed side by side. The arrows show the waves emitted by the emitter and reflected by the satellite 15 when it passes below the sensor.

Essentially, the optical sensor 20 generates a pulse each time the satellite 15 passes below it.

The pulse generated by the sensor is fed to a control unit 200 on the basis of preset parameters (including the lubricant volume passing through the flowmeter for each satellite revolution) calculates the flow rate passing through the meter.

The control unit 200, which for example can be fitted directly on the meter as is the case in FIG. 1 or be provided in a remote position, calculates on the basis of the received pulses the effective flow rate passing through the flowmeter 5A. This flow rate can be advantageously displayed on a display 22 for example provided directly on the control unit 200.

The flow rate can be set by means of the regulator valve 10 on the basis of the control unit reading.

In proximity to the transparent part through which the satellite movement can be seen (first zone 18) a light source is installed, facilitating vision of the satellite especially when the regulator device is positioned in poorly lit environments.

The light source 20 is controlled, for example by the control unit 200, such as to assume a first state when the lubricant flow rate passing through the meter is within a predetermined range and a second state in which the lubricant flow rate is outside said range. This is extremely advantageous in making valve adjustment quicker.

By way of example, when the light source is in said first state it emits green light and when in said second state it emits red light. Essentially, if the flow rate is within an optimal range set in the control unit, at least the first zone 18 and the satellite 15 are illuminated in green.

When instead the flow rate is outside the optimal value these are lit in red, is immediately indicating a problem.

This is extremely effective both during adjustment of the valve 10 and during control. In this respect as already described, a large number of flow regulator devices 5 are often mounted side by side, within appropriately dedicated control zones with various rows of regulators.

Consequently a lighting coloration indicating a meter state immediately enables that regulator in which a problem exists to be noted, this being illuminated in red among all the others illuminated in green.

The light source can obviously assume other configurations: for example, when said light source is in said first state it emits fixed light, and when it is in said second state it emits intermittent light, or when said light source is in said first state it emits light whereas when in said second state it does not emit light, etc.

It should be noted that the light source is preferably configured and positioned such as to illuminate with its light all those portions of the transparent part 16B facing the regulator perimeter.

In the description of the invention it should be noted that the transparent part is configured such as to be superposable on the base 16A and to have its same perimetral shape. It follows that a portion of the transparent part 16B is visible from any side of the meter.

If several regulator devices are positioned side by side only the top and bottom front portions (of FIG. 5 for example) of the transparent part are visible.

Essentially the transparent part is visible from at least three sides of said meter, said sides being respectively the side 31 overlying the lubricant flow rate regulating control 10, the side 30 overlying an outlet 8 for said lubricant and that face 18A at which said first zone 18 is present.

The light source 20 (which can obviously be composed of several sources) is located in a position such as to be visible through said transparent part from all of said at least three sides of the meter. Several light sources can also be provided positioned in various parts of the transparent part, which contribute to illuminating or colouring all the visible parts thereof.

In concluding the description of the present device it should be noted that the transparent part 16B is sandwiched between the base 16A in which part of the seat 160 housing said satellite is provided and an upper plate 16C (preferably metallic) locked by fixing screws engaged in said metal base.

As can be seen from the drawings, the upper plate 16C evidently presents windows 35 and 36, provided in the first and second zone.

Figure 3:
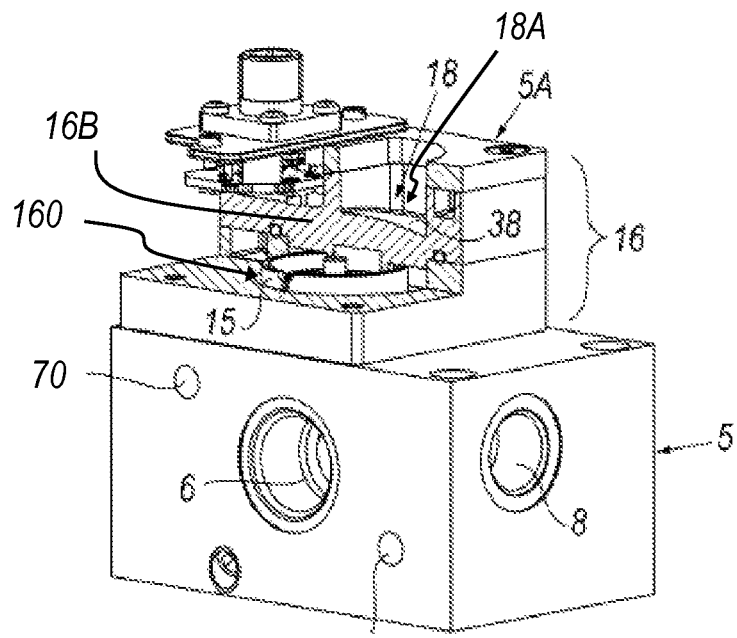
FIG. 3 is a perspective view of the device of FIG. 1 in which some parts of the flowmeter are shown partly sectioned.

As can be seen from the sectional view of FIG. 3, the transparent part 16B presents, in said first zone through which the satellite 15 can be seen, a lens-shaped surface 38 such as to enlarge and improve the vision of said satellite.

Finally it should be noted that, as is well visible in FIG. 4, the optical sensor is positioned on a printed circuit 40 which also supports the light source.

In particular it is housed in a cavity 39 provided in the transparent part, in the second zone.

The printed circuit 40 is fixed to a removable piece 41 from which a pin 42 projects, to be coupled to a corresponding socket 43 of the control unit or of a cable connecting to the control unit.

When the sensor needs to be replaced, the only operation required is to disconnect the pin 42, unscrew the fixing screws 44, and position a removable piece 41.

The optical sensor does not require calibration.

The invention claimed is:

1. A lubrication device comprising:
   a tank for fluid lubricant to be dispensed to a user position, means for raising the pressure of the lubricant,
a lubricant flow rate regulator device for regulating flow rate of the lubricant under pressure, and
distribution means enabling flow of the lubricant to be conveyed to the user position with regulated flow rate,
the lubricant flow rate regulator device comprising a lubricant flowmeter which reads the flow rate regulated by the lubricant flow rate regulator device,
the flowmeter being of volumetric type and presenting a satellite which, urged by the lubricant flow, describes an orbit each time a predetermined quantity of lubricant flows through the lubricant flow rate regulator device, and
a sensor which generates a pulse each time the satellite describes an orbit,
wherein the satellite is movable within a seat defined by at least one transparent part, the transparent part presenting a first zone through which the satellite movement can be seen from outside the device and a second zone in which an optical sensor is located arranged to sense passage of the satellite below the optical sensor, wherein the satellite is horizontally movable in relation to the seat to orbit along a horizontal plane within the seat, wherein the seat in which the satellite moves has sidewalls, a bottom wall, and an upper face, the upper face is defined by the transparent part, the window and optical sensor being above the seat and above the horizontal plane of the orbit of the satellite.

2. A device as claimed in claim 1, wherein the optical sensor presents an emitter and a receiver positioned side by side to locate the emitter next to the receiver.

3. A device as claimed in claim 1, wherein a light source is installed in proximity to the transparent part through which the satellite movement can be seen, and enables the satellite to be illuminated to make vision of the satellite possible even in poorly lit environments when the light source emits light.

4. A device as claimed in claim 3, wherein the light source is controlled to assume at least one first state when the lubricant flow rate through the flowmeter is within a predetermined range and at least one second state in which the lubricant flow rate is outside said range.

5. A device as claimed in claim 4, wherein when the light source is in the first state it emits green light and when in the second state it emits red light, or when the light source is in the first state it emits fixed light and when in the second state it emits intermittent light, or when the light source is in the first state it emits light and when in the second state it does not emit light.

6. A device as claimed in claim 3, wherein the light source is configured and positioned to illuminate with its light all those portions of said transparent part facing a perimeter of the lubricant flow rate regulator device.

7. A device as claimed in claim 3, wherein at least one portion of the transparent part is visible from at least first, second and third sides of said flowmeter, said first side overlying a lubricant flow rate regulating control, said second side overlying an outlet for the lubricant, and the third side being a face at which the first zone is present.

8. A device as claimed in claim 7, wherein the light source is located in a position such that its light is visible through the transparent part from all the at least three sides of the flowmeter.

9. A device as claimed in claim 1, wherein the transparent part is sandwiched between a base which defines part of the seat housing the satellite and a plate.

10. A device as claimed in claim 1, wherein the transparent part, in the first zone through which the satellite can be seen, presents a lens-shaped surface to enlarge and improve the visibility of the satellite.

11. A device as claimed in claim 1, wherein the optical sensor is housed in a cavity formed in the transparent part.

12. A device as claimed in claim 1, wherein the transparent part is sandwiched between a base which defines part of the seat housing the satellite and a plate.

13. A lubrication device comprising:
a tank for fluid lubricant to be dispensed to a user position,
means for raising the pressure of the lubricant,
a lubricant flow rate regulator device for regulating flow rate of the lubricant under pressure, and
distribution means enabling flow of the lubricant to be conveyed to the user position with regulated flow rate,
the lubricant flow rate regulator device comprising a lubricant flowmeter which reads the flow rate regulated by the lubricant flow rate regulator device,
the flowmeter being of volumetric type and presenting a satellite which, urged by the lubricant flow, describes an orbit each time a predetermined quantity of lubricant flows through the lubricant flow rate regulator device, and
a sensor which generates a pulse each time the satellite describes an orbit,
wherein the satellite is movable within a seat defined by at least one transparent part, the transparent part presenting a first zone through which the satellite movement can be seen from outside the device and a second zone in which an optical sensor is located arranged to sense passage of the satellite below the optical sensor,
wherein a light source is installed in proximity to the transparent part through which the satellite movement can be seen, and enables said satellite to be illuminated to make vision of the satellite possible even in poorly lit environments when the light source emits light,
wherein said light source is controlled to assume at least one first state when the lubricant flow rate through the meter is within a predetermined range and at least one second state in which the lubricant flow rate is outside said range,
wherein when said light source is in said first state it emits green light and when in said second state it emits red light, or when said light source is in said first state it emits fixed light and when in said second state it emits intermittent light, or when said light source is in said first state it emits light and when in said second state it does not emit light.

14. A device as claimed in claim 13, wherein a light source is installed in proximity to the transparent part through which the satellite movement can be seen, and enables the satellite to be illuminated to make vision of the satellite possible even in poorly lit environments when the light source emits light.

15. A device as claimed in claim 14, wherein the light source is controlled to assume at least one first state when the lubricant flow rate through the flowmeter is within a predetermined range and at least one second state in which the lubricant flow rate is outside said range.

16. A device as claimed in claim 14, wherein the light source is configured and positioned to illuminate with its light all those portions of said transparent part facing a perimeter of the lubricant flow rate regulator device.

17. A lubrication device comprising:
a tank for fluid lubricant to be dispensed to a user position,
means for raising the pressure of the lubricant, a lubricant flow rate regulator device for regulating flow rate of the lubricant under pressure, and distribution means enabling flow of the lubricant flew to be conveyed to sa-i-Gi the user position with regulated flow rate, the lubricant flow rate regulator device comprising a lubricant flowmeter which reads the flow rate regulated by the lubricant flow rate regulator device, the flowmeter being of volumetric type and presenting a satellite which, urged by the lubricant flow, describes an orbit each time a predetermined quantity of lubricant flows through the lubricant flow rate regulator device, and a sensor which generates a pulse each time the satellite describes an orbit, wherein the satellite is movable within a seat defined by at least one transparent part, the transparent part presenting a first zone through which the satellite movement can be seen from outside the device and a second zone in which an optical sensor is located arranged to sense passage of the satellite below the optical sensor, wherein the transparent part is sandwiched between a base in which part of the seat housing said satellite is provided and a plate locked by fixing screws engaged in the base.

18. A device as claimed in claim 17, wherein a light source is installed in proximity to the transparent part through which the satellite movement can be seen, and enables the satellite to be illuminated to make vision of the satellite possible even in poorly lit environments when the light source emits light.

19. A device as claimed in claim 18, wherein the light source is controlled to assume at least one first state when the lubricant flow rate through the flowmeter is within a predetermined range and at least one second state in which the lubricant flow rate is outside said range.

20. A device as claimed in claim 18, wherein the light source is configured and positioned to illuminate with its light all those portions of said transparent part facing a perimeter of the lubricant flow rate regulator device.

* * * * *